United States Patent
Montreuil et al.

(10) Patent No.: US 8,971,307 B2
(45) Date of Patent: Mar. 3, 2015

(54) NOISE INGRESS CANCELATION

(71) Applicant: Cisco Technology, Inc., San Jose, CA (US)

(72) Inventors: Leo Montreuil, Atlanta, GA (US); Rick Meller, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 152 days.

(21) Appl. No.: 13/721,853

(22) Filed: Dec. 20, 2012

(65) Prior Publication Data

US 2014/0177620 A1   Jun. 26, 2014

(51) Int. Cl.
*H04B 7/212* (2006.01)
*H04L 27/01* (2006.01)
*H04B 1/10* (2006.01)

(52) U.S. Cl.
CPC .  *H04L 27/01* (2013.01); *H04B 1/10* (2013.01)
USPC ........................................................ 370/347

(58) Field of Classification Search
USPC ......................................... 370/335, 337, 347
See application file for complete search history.

(56) References Cited

U.S. PATENT DOCUMENTS

| | | | |
|---|---|---|---|
| 4,852,090 A * | 7/1989 | Borth | 370/347 |
| 5,717,717 A * | 2/1998 | Yang et al. | 375/232 |
| 6,426,983 B1 | 7/2002 | Rakib et al. | |
| 6,826,242 B2 | 11/2004 | Ojard et al. | |
| 7,106,815 B2 | 9/2006 | Popper et al. | |
| 7,177,614 B2 * | 2/2007 | Agarwal et al. | 455/296 |
| 7,526,565 B2 | 4/2009 | Amini et al. | |
| 7,573,947 B2 | 8/2009 | Arad | |
| 2008/0069258 A1 | 3/2008 | Arad | |

* cited by examiner

*Primary Examiner* — Mohammad Anwar

(57) ABSTRACT

A demodulator can include an ingress exciser configured to remove ingress noise from a burst mode digital input signal that is above a predetermined threshold and resides within a narrowband. An adaptive equalizer can be configured to adaptively equalize an estimate of the signal provided from the ingress exciser and to provide an adaptively equalized signal. An ingress predictor can be configured to subtract an estimate of remaining predicted ingress noise from the adaptively equalized signal to provide a resultant signal that is substantially free of the ingress noise.

20 Claims, 5 Drawing Sheets

NOISE INGRESS CANCELATION

TECHNICAL FIELD

This disclosure relates to performing ingress cancelation and ingress prediction, such as may be combined in a demodulator.

BACKGROUND

In various types of networks, narrow band interfering signals can inject themselves into a spectrum. These narrow band interfering signals are referred to as ingress noise. In burst mode types of communication protocols, such as time division multiple access (TDMA), narrow band ingress can occupy and hinder numerous frequencies where spectrum is at a premium. For example, such narrow band ingress can occupy the up-stream band of cable data communication systems, such as employing a version of the Data Over Cable Service Interface Specification (DOCSIS) standard. Thus, in modern high bandwidth DOCSIS networks, it is no longer practical to avoid frequencies where such narrow band ingress is present. This narrow band ingress degrades the demodulation fidelity of up-stream burst signals that encompass the ingress in DOCSIS systems such that the modulation error ratio (MER) is too low causing unacceptably high symbol/bit errors.

DESCRIPTION OF EXAMPLE EMBODIMENTS

Overview

This disclosure relates to systems and methods to remove noise from burst mode communications by employing ingress excision and ingress prediction. As an example, a reverse path burst mode signal (e.g., a TDMA signal) can be received from at least one modem. Ingress noise from within a predetermined notch of the received signal can be excised to provide a corresponding excised signal. Additional processing, including gain scaling and adaptively linearly equalizing, can be performed on an estimation of the corresponding excised signal to provide an adaptively equalized signal. An ingress predictor can predict an estimate of ingress noise remaining in the adaptively equalized signal for each valid burst condition based on a hard decision output that is substantially free of ingress. The predicted ingress can be subtracted from the adaptively equalized signal to provide an output that is substantially free of the predicted ingress noise, based on which a demodulated output signal, corresponding to the hard decision output, can be generated for further processing.

Example Embodiments

Figure 1:
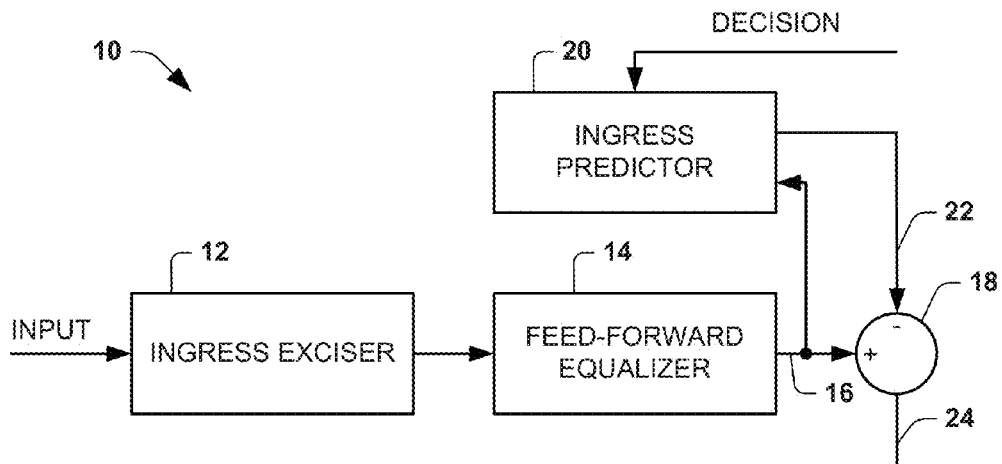
FIG. 1 depicts an example of a system to mitigate narrow-band ingress.

FIG. 1 depicts an example of a system 10 to remove narrow band ingress from a burst mode input signal. In the example of FIG. 1, it is presumed that the input signal includes narrow band ingress in a frequency band of interest. The ingress can be caused by external interfering sources along a transmission line, such as along a reverse (e.g., upstream) path of cable system (e.g., a hybrid fiber coaxial infrastructure). For the example of an upstream path implemented according to DOCSIS, the ingress can originate as electrical interference to reverse electrical signals and/or optical noise that can adversely affect an upstream path spectrum (e.g., 5-42 MHz, 5-65 MHz or 5-85 MHz). The particular spectrum can vary according to the specifications of the system.

By way of example, the input signal can be a digital representation of a time division multiple access (TDMA) signal transmitted according to a DOCSIS standard. The signal can include TDMA transmissions from one or more downstream modems. The system 10 can correspond to part of demodulator to reconstruct digital signals from each of the downstream modems. An ingress exciser 12 can be configured (e.g., as a notch filter) to remove digital content having a predetermined frequency and amplitude above a threshold, which can be programmable. For example, the ingress exciser 12 can convert the digital input into a frequency domain representation via a fast Fourier transform (FFT) and remove selected frequency content, corresponding to ingress noise, having an amplitude above a threshold. The remaining content, which includes ingress noise outside of the notch filter and amplitude and other signal content, can be converted back to a digital time domain representation of the signal (e.g., via an inverse FFT operation).

The output of the ingress exciser 12 can drive a feed forward equalizer (FFE) 14. The FFE 14 can be configured to implement gain scaling and adaptive equalization on the excised signal provided by the ingress exciser 12. The FFE 14 can equalize the signal based on a FFE error signal that is fed back to the FFE. The FFE 14 can provide a gain-scaled and adaptively equalized output 16 to an ingress subtraction block 18. An ingress predictor 20 can compute predicted ingress 22 based on the equalized output 16 and hard decisions (e.g., computed by a slicer). The subtraction block 18 can subtract the predicted ingress 22 from the equalized signal (containing signal content and ingress noise) to produce an output signal 24 from which the predicted ingress has been cancelled by the subtraction function of the block 18. As an example, the ingress predictor 20 can operate (e.g., according to a leaky least mean square algorithm) to reduce an error corresponding to a difference between the actual interference and the predicted interference.

Figure 2:
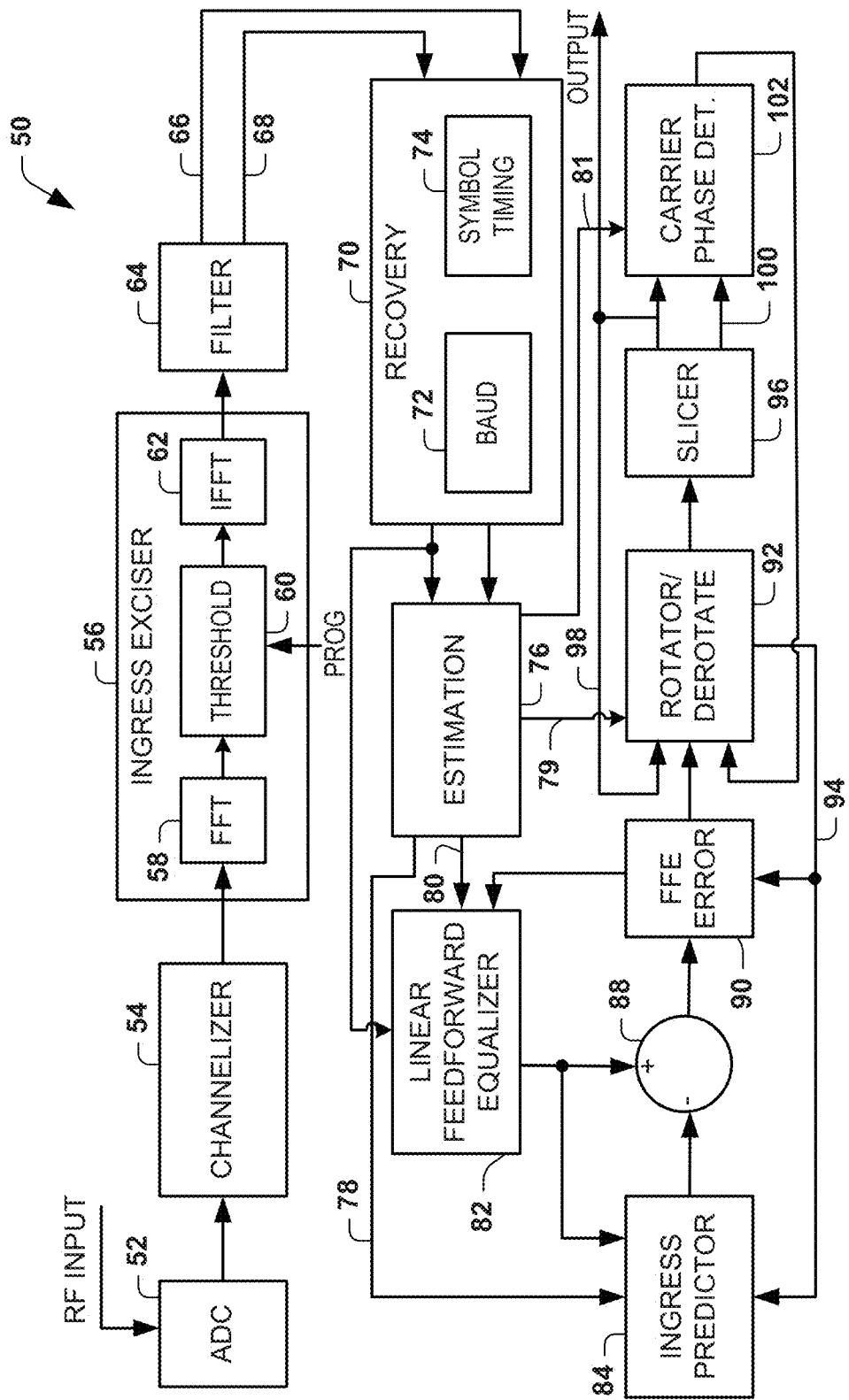
FIG. 2 depicts an example of a demodulator configured to mitigate narrow band ingress.

FIG. 2 depicts an example of a demodulator 50 that can implement ingress cancellation. In some examples, the demodulator 50 can demodulate a modulated RF input signal, such as including content provided by a burst modulator and interference provided by one or more sources of narrowband ingress noise. The demodulator 50 can include an analog-to-digital converter (ADC) 52 to sample the RF input signal within a predetermined frequency band (e.g., the 5-85 MHz band) and provide a quantized representation of the RF input. A channelizer 54 is configured to convert the digital signal to a corresponding baseband representation of the signal at a desired baud rate. For example, the channelizer 54 can be configured to perform complex down conversion to remove any carrier in the 5-85 MHz band and translates the frequency to base-band. The channelizer 54 can also be configured to perform a decimation and filtering operation to convert the high ADC sample rate down to reduced rate, such as at least 2× the desired baud/chip rate.

Once the signal has been converted to base-band, decimated and filtered, an ingress exciser 56 performs ingress excision. The ingress exciser 56 is configured to notch out strong levels of ingress, which can be evaluated according to a carrier-to-ingress ratio (CIR). In some examples, the threshold of the ingress exciser can be set to remove ingress from the signal within a predefined notch of frequencies that have a CIR that is less than about −10 dBc (decibels relative to the carrier). In addition to removing ingress interference from the desired signal, the ingress exciser 56 helps to protect the rest of the signal processing chain in the demodulator 50 from over-load/clipping. The ingress exciser 56 thus enables the demodulator 50 to achieve robust demodulation performance in the presence of very strong ingress since ingress prediction (and subtraction) alone would suffer from poor performance at these very strong levels of ingress.

As a further example, the ingress exciser 56 includes an FFT block 58 to convert the signal to the frequency domain, such as including a plurality of frequency bins. A threshold 60 is applied to remove frequencies within a specified notch that exceeds a specified CIR level, such as mentioned above. For example, each frequency bin within the narrowband having a magnitude that exceed the programmable threshold can be cancelled, such as by multiplying the bin by an excision factor (e.g., zero). The excision can be zero or set to another programmable low value that is less than one and chosen to substantially remove most (e.g., about 90% or more) of the narrowband ingress for each bin that exceeds the excision threshold. For the example of a DOCSIS burst having a given max bin level, an excision threshold for excising narrowband ingress may be set at about 10% greater (or more) than the given max bin level of the burst signal. The excision threshold can also be programmable, such as can be in response to a user input. In other examples, the excision threshold can be automatically set (e.g., periodically) to a predetermined level (e.g., 10%) greater than an average maximum bin level of the burst signal. Scaling of the FFT bins also can be performed. For instance, scaling (e.g., about ½ or other fractional portion) can be applied following excision, such as to reduce the level of bins adjacent (e.g., before and after) the excised bins that exceeded the threshold, such as to smooth the exciser response. In this way, high amplitude ingress within a predetermined notch (or multiple notches) frequency range can be cancelled. The ingress exciser 56 also includes an IFFT block 62 that converts the frequency domain signal, absent excised ingress, back to a digital time domain representation. The ingress exciser 56 provides the digital time domain representation of the excised signal downstream for further demodulation processing.

A filter block 64 is configured to filter the signal from the ingress exciser such as to provide a matched filter response 66 and a pre-filter signal 68. For example, the filter 64 can be implemented as a SQRT-RC Nyquist filter and pre-filter block whose functions are to create a matched filter response with the burst modulator source as well as a pre-filter to help with the baud/chip tracking process. The output of the filter block can feed a recovery network 70. The recovery network 70 can include symbol timing recovery 74 and baud chip timing recovery 72. The symbol timing recovery 74 can be configured to implement baud/chip tracking by detecting a preamble of the burst mode signal. That is, the symbol timing recovery enables the demodulator to detect and lock on to a valid burst (e.g., a valid DOCSIS burst) as compared to triggering on impulse/burst noise or some other non-DOCSIS signal received at the input. The symbol timing recovery block thus can output an interpolation factor, Mu, which feeds the Baud/Chip timing interpolation block 72. The symbol timing recovery block 74 can also provide an enable signal (e.g., a logic output of 1 or 0) to indicate a valid burst condition. The enable signal can feed the rest of the demodulation circuitry for operating on valid bursts. The symbol timing recover block 74 can also produce an estimation bus signal, which feeds an estimation block 76. The baud block 72 can also fine tune the correct baud/chip sampling times based on the interpolation factor from the symbol recovery block 74. The fine tune estimate of the recovered signal from the baud block 72 thus helps maximize MER performance.

The estimation block 76 is configured to provide signal estimates and timing for downstream processing based on the symbol estimate and the fine tune estimate from the recovery network 70. For example, the estimation block can include estimation blocks to provide a burst timing signal 78, a signal magnitude estimate 80, a signal phase estimate 79 and a carrier frequency offset (CFO) estimate 81, which signals feed various processing blocks as disclosed herein.

A linear feedforward equalizer 82 is configured to implement gain scaling and adaptively equalization on the estimated magnitude 80 fine tuned filtered signal from the recovery network 70. For example, the equalizer 82 can include a linear T-spaced equalizer to adaptively equalize the signal estimates (estimated magnitude and fine tuned estimate) to provide an adaptively equalized signal (e.g., corresponding to the desired signal plus ingress) to an ingress predictor 84 and to a subtractor 88. For example, the linear T-spaced equalizer can include a set of tap coefficients programmed to linearly weight samples of the signal estimates according to an equalization algorithm (e.g., least mean square). The tap coefficients of the equalizer 82 can be periodically sent to specific cable modems in the forward path signal according to a schedule, such as part of a ranging process. The tap coefficients can be utilized for configuring each cable modem's reverse path transmit pre-equalization.

The burst timing signal 78 from the estimation block 76 can also drive the ingress predictor 84 along with a re-rotated signal (e.g., the desired signal without ingress) to compute an output corresponding to predicted ingress noise. The ingress predictor 84 can provide the predicted ingress to a negative input of the subtractor 88. The subtractor 88 can subtract the predicted ingress from the adaptively equalized signal to produce a desired signal that is substantially free of narrowband ingress. The re-rotation (e.g., by rotator 92) is utilized to adjust for signal rotation due to a finite carrier offset in the signals at this stage.

The subtractor 88 provides the desired signal to a FFE error block 90. The FFE error block provides an error estimate back to the adaptive equalizer 82 based on the ingress free signal and the re-rotated signal. The FFE error block 90 also provides an output quantization signal to a rotator 92. As mentioned, the rotator 92 is configured to provide a re-rotated output to the ingress predictor 84 and to the FFE error block 90 based on a slicer output corresponding to the demodulated output and a phase output of the demodulator. The rotator 92 also provides a de-rotated output of soft decision estimates to an input of a slicer 96. The slicer also receives the burst-T signal to generate an output that includes a hard decision 98, corresponding to demodulated output, and an associated error 100. The slicer outputs 98 and 100 are unrotated relative to the re-rotated signal 94 that is provided to the ingress predictor

84. A carrier phase detect block 102 in turn provides a phase detect output based on the slicer outputs 98 and 100 and a CFO estimate 81 from the estimation block 76. The output from the carrier phase detect block 102 is fed back to the rotator 92 at valid burst conditions. The CFO estimate 81 thus works with the carrier phase detect block to mitigate residual carrier frequency offsets in the output 98.

The phase estimate signal works with the rotator 92 to achieve zero carrier phase set. The magnitude estimate signal 80 works with the gain scale and equalization block 82 to place the signal at the correct amplitude. The burst timing signal works to establish selected signal times (e.g., preamble area, data area and quiet time area) for various blocks in the demodulator 50.

Figure 3:
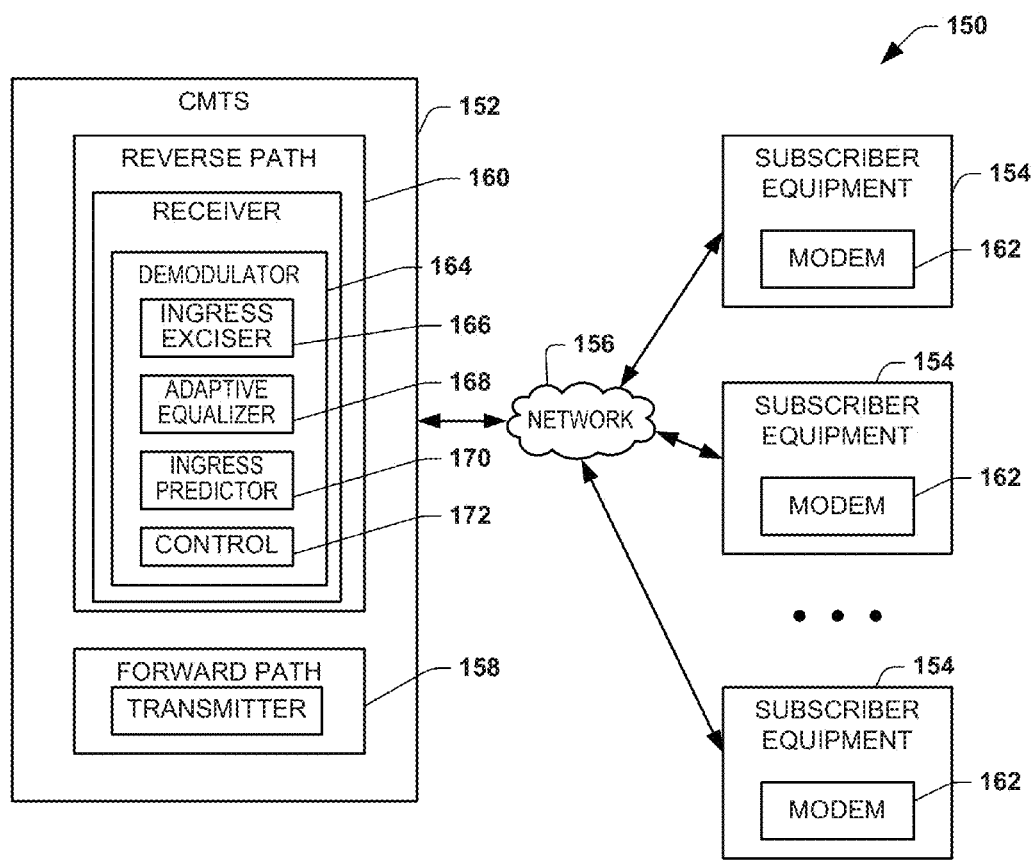
FIG. 3 depicts an example of part of a cable plant that can implement ingress removal.

FIG. 3 depicts an example of a cable system 150 that can implement narrowband ingress cancellation as disclosed herein. The system 150 can include a cable modem termination system (CMTS) 152, such as can be implemented at a headend of a cable plant. The CMTS 152 can communicate information with subscriber equipment (e.g., consumer premises equipment) 154 via a network 156. The network 156 can include physical (e.g., optical and electrically conductive) connections and/or wireless links (e.g., cellular, WLAN, WMAN, WiMax or the like) extending between the subscriber equipment and the CMTS 152. For example, the network 156 can be a cable network that communicates electrical signals over a coaxial cable or a hybrid-fiber coaxial (HFC) network that communicates a combination of optical and electrical signals. As mentioned, the network 156 further may employ wireless communications.

The CMTS 152 can communicate with the subscriber equipment 154 using reverse path electronics 160 and forward path electronics 158. For example, each of the subscriber equipment 154 can include one or more modems 162 configured to send data upstream via the network 156 to the reverse path electronics 160. The modems 162 can also receive data sent downstream via the network 156 from the forward path electronics 158. That is, the reverse path electronics can include a receiver and the forward path electronics can include a transmitter configured to respectively receive and send data according to a predetermined communications protocol, such as DOCSIS.

As a further example, the reverse path electronics 160 can include a demodulator 164 configured to demodulate reverse path signals transmitted by one or more of the modems 162 within a prescribed frequency band (e.g., 5-85 MHz band). The demodulator 164 can be configured to cancel narrowband ingress within the prescribed frequency band, such as disclosed herein. The demodulator 164 can be configured as disclosed with respect to the demodulator 50 of FIG. 2.

Briefly, the demodulator 164 can include an ingress exciser 166 to remove digital content having a predetermined frequency within the prescribed band and amplitude above a cancellation threshold. For example, the ingress exciser 166 can include FFT and IFFT blocks to remove selected narrow band ingress noise, having an amplitude above the threshold. A gain scaling and adaptive equalizer (e.g., FFE) 168 can implement gain scaling and adaptive equalization based on the signal provided by the ingress exciser 166. An ingress predictor 170 can compute predicted ingress based on the equalized output 16 and soft decision (e.g., computed by a slicer) to provide a desired signal in which narrowband ingress has been cancelled via a two stage cancellation involving excision and prediction.

The demodulator 164 can also include a control 172 configured to control the ingress cancellation as well as the adaptive equalizer 168. For example, the control 172 can operate station maintenance periodically according to a predefined schedule. The station maintenance can include receiving a ranging request from individual modems at scheduled times and sending a ranging response to modems in response to such request. The modem employs parameters in the ranging response to set coefficients of a pre-equalizer to mitigate distortion over the reverse transmission path between the modem and the CMTS. The control 172 can also process ranging requests from each of the modems (e.g., during scheduled station maintenance times established by the burst timing signal) for configuring the adaptive equalizer 168. The adaptive equalizer 168 can re-compute equalization tap coefficients (e.g., 24 taps for DOCSIS 3.0) based on the response from the modems 162 and provide respective equalization coefficients to the modems 162 via the forward path electronics 158 over the network 156. The modems 162 can convolve the tap coefficients from the CMTS with pre-equalization coefficients to generate new pre-equalizer coefficients. Since each modem 162 can have different path distortions, the modems can pre-equalize the reverse path signals to mitigate channel distortions in signal sent via the reverse path to the CMTS 152. The pre-equalization can further free up the adaptive equalizer 168 to remove distortions and facilitate the ingress prediction process with reduced overhead.

Figure 4:
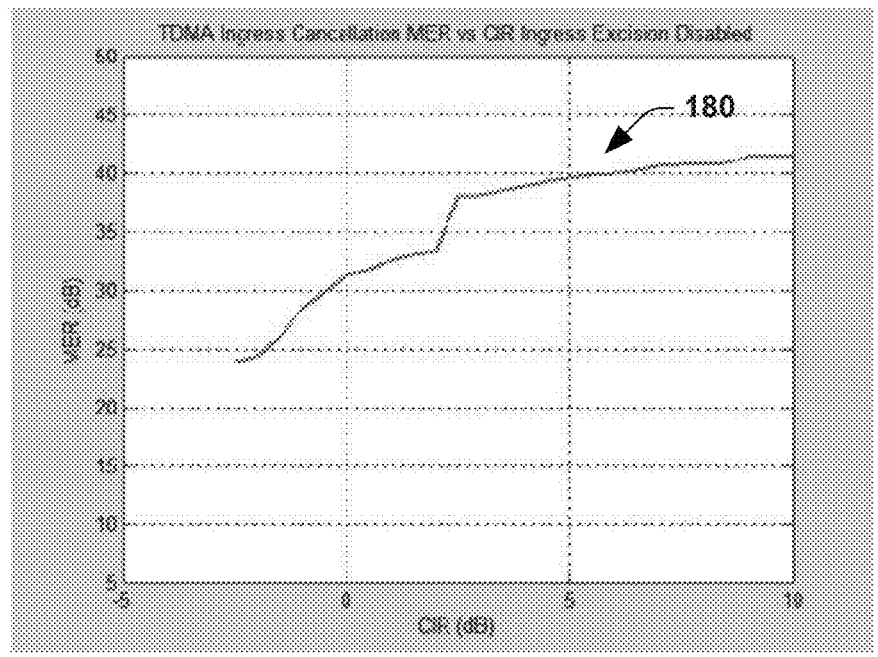
FIG. 4 depicts an example of a graph demonstrating carrier to ingress ratio in a system implementing ingress excision.
Figure 5:
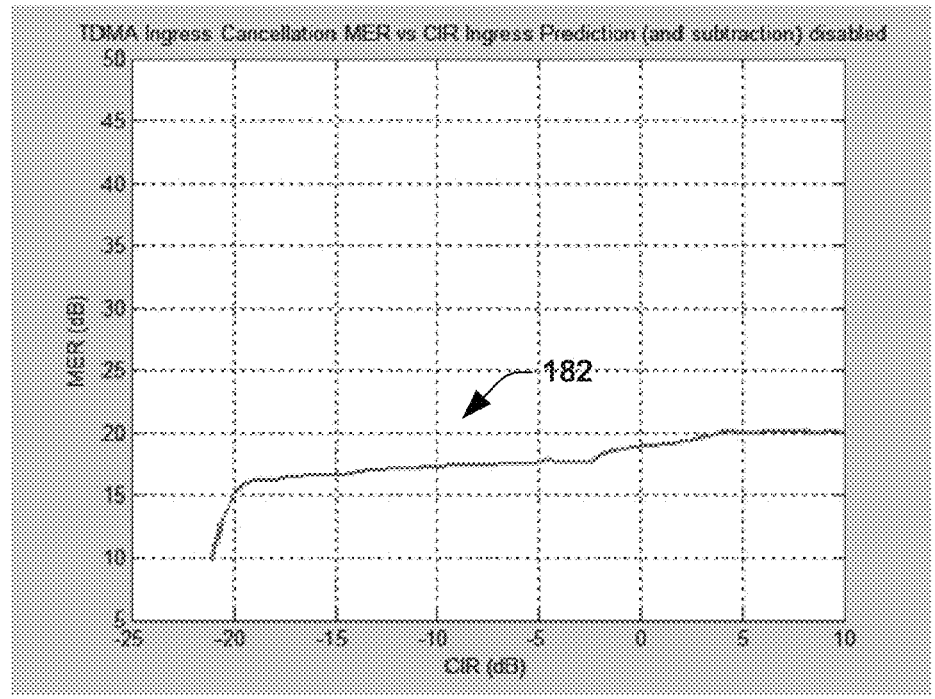
FIG. 5 depicts an example of a graph demonstrating carrier to ingress ratio in a system implementing ingress prediction.
Figure 6:
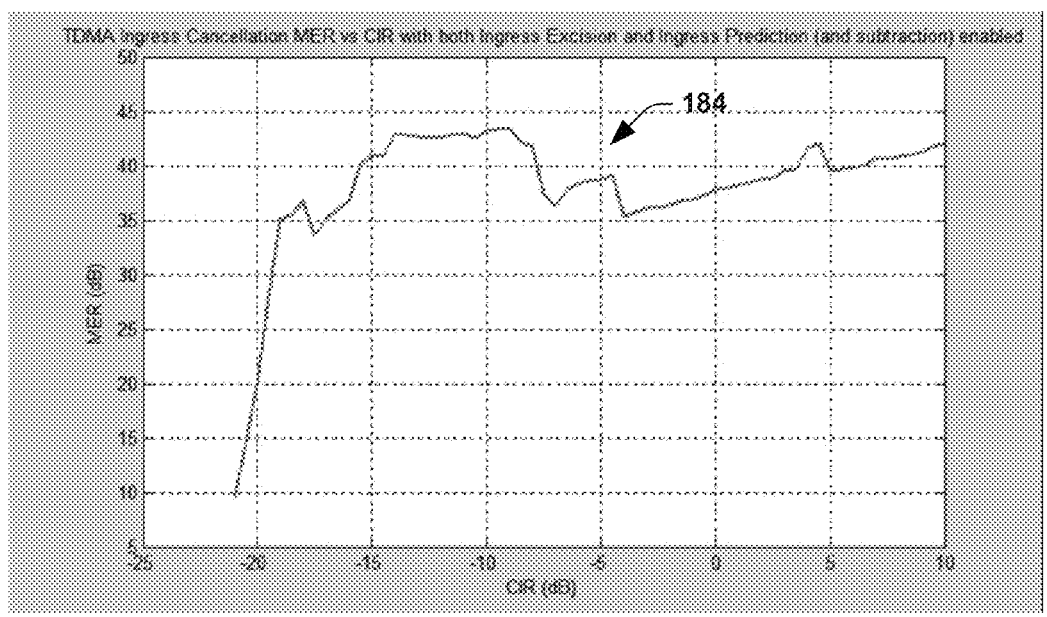
FIG. 6 depicts an example of a graph demonstrating carrier to ingress ratio in a system implementing ingress excision and ingress prediction.

As a further example, FIGS. 4, 5 and 6 demonstrate comparative examples of ingress cancellation to demonstrate advantages of the approach disclosed herein. Each of FIGS. 4, 5 and 6 demonstrates plots 180, 182 and 184 of MER (in dB) versus carrier to ingress ratio (CIR) for different approaches of ingress cancellation for TDMA signals. In FIG. 4, the plot 180 demonstrates results of ingress cancellation based on ingress prediction only without including ingress excision. In FIG. 4 a worst case CIR of about −2.5 dB exhibits an MER of about 24 dB. For moderate levels of CIR (>0 dB) the MER can exceed about 32 dB. In FIG. 5, the plot 182 demonstrates ingress cancellation based on ingress excision without including ingress prediction. In contrast to prediction only, the example of FIG. 5 shows operation over a worse range of CIR levels but with MER being limited to about 20 dB for moderate levels of CIR (e.g., >0 dB). In FIG. 6, the plot 184 depicts an example of performing ingress cancellation employing both the ingress excision and the ingress prediction as disclosed herein. The example of FIG. 6 demonstrates that the combined ingress excision and prediction affords a much larger range of ingress CIR values with a higher MER fidelity.

Figure 7:
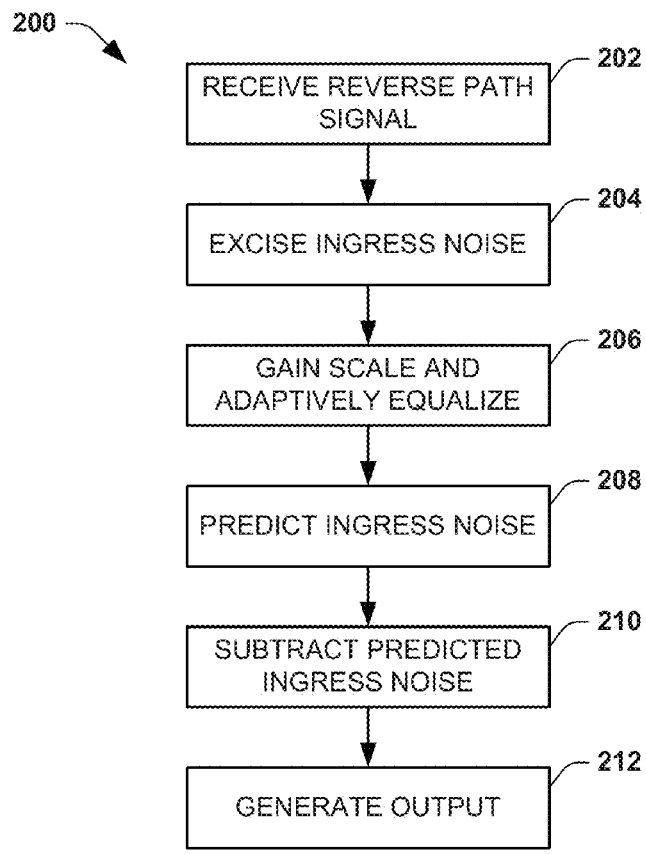
FIG. 7 is a flow diagram demonstrating an example method of ingress excision and ingress prediction.

In view of the foregoing examples, a method of processing signals will be appreciated with reference to FIG. 7. While, for purposes of simplicity of explanation, the example method 200 of FIG. 7 is shown and described as executing serially, the present examples are not limited by the illustrated order, as some actions could in other examples occur in different orders and/or concurrently from that shown and described herein. Moreover, it is not necessary that all disclosed actions be performed to implement a method. The method can be implemented as hardware (e.g., a field programmable gate array (FPGA) or an application specific integrated circuit (ASIC)) or as instructions that can be stored in memory and executed by one or more processors (e.g., a digital signal processor), such as residing in a demodulator at a headend of a cable system that is configured to receive burst mode signals over a reverse (e.g., upstream) path, such as disclosed herein.

The method 200 of FIG. 7 begins at 202 in which a burst mode signal is received (e.g., at a demodulator). For example, the received signal can include desired TDMA signals transmitted in a predetermined frequency band (e.g., about 5-85

MHz) from one or more cable modems residing downstream from the demodulator that receives the signals. The received signal can also include narrowband ingress noise. The signals can be received as RF signals that are converted to corresponding digital signals in a desired digital baseband format for further processing.

At 204, narrowband ingress is excised from the digital baseband signal. For example, the excision can occur at the baud frequency (e.g., about 160 K symbols per second to about 5.12 M symbols per second). The ingress excision can be performed by applying a FFT to the baseband signal, removing signal components within a predetermined frequency notch with a power that exceeds a threshold and applying IFFT to provide a corresponding signal without the excised ingress. The ingress excision at 204 thus removes strong ingress interference that exists above the threshold. At this stage, however, ingress interference that exists below the threshold can remain in the signal.

At 206, gain scaling and adaptive equalization can be applied to the signal from the excision at 204 to place the signal at the correct amplitude and provide an adaptively equalized signal. The adaptive equalization, for example, can be implemented by a linear T-space equalizer having a set of tap coefficients (e.g., a tap coefficient vector) to balance the signal across the spectrum and mitigate intersymbol interference. The tap coefficients can be adjusted over time according to an adaptive algorithm (e.g., least-mean squares, method of steepest descent, mean-squared error or the like). Prior to gain scaling and equalization, additional processing such as generating a matched filter response, pre-filtering and pre-amble detection to facilitate triggering scaling and equalization at 206 for valid bursts.

At 208, ingress noise can be predicted on the adaptively equalized signal. The ingress prediction can be based on a slicer output, representing the signal without ingress, which is fed back for predicting ingress relative to the adaptively equalized signal. At 210, the predicted ingress can be subtracted from the adaptively equalized signal to produce a desired signal. Since the signal output from the subtraction (e.g., corresponding to the desired signal) can include residual errors such as due to the prediction and intersymbol interference and microreflections, such errors can be determined and fed back as a feed forward error signal to facilitate the adaptive equalization at 206.

At 212 a corresponding output signal can be generated with the ingress removed at 204 and 210. For instance, the output can include hard decisions from a slicer. The slicer can receive a de-rotated version of the desired signal and select nearest ideal symbol (e.g., hard decision), from the QAM constellation as well as compute a corresponding error. Carrier phase detection can be performed on the slicer output, the results of which can be fed back to reduce or eliminate the carrier phase offset from the desired signal in a rotation/de-rotation function that is applied prior to the slicer. Thus, the method 200 can achieve improved ingress cancellation by combining ingress excision and ingress prediction as disclosed herein.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus comprising:
   an ingress exciser configured to remove ingress noise from a burst mode digital input signal that is above a predetermined threshold and resides within a narrowband and to generate an excised signal that is substantially free of ingress noise above the predetermined threshold within the narrowband;
   an adaptive equalizer configured to adaptively equalize an estimate of the excised signal provided from the ingress exciser and to provide an adaptively equalized signal; and
   an ingress predictor configured to predict an estimate of remaining ingress noise in the adaptively equalized signal, the estimate of remaining predicted ingress noise being subtracted from the adaptively equalized signal to provide a resultant signal that is substantially free of the ingress noise.

2. The apparatus of claim 1, wherein the ingress exciser is configured to implement a narrowband notch filter.

3. The apparatus of claim 1, wherein the ingress exciser further comprises:
   a fast Fourier transform to convert the burst mode digital input signal from a time domain to a frequency domain representation;
   a threshold function to remove a selected portion of the frequency domain representation having a magnitude that exceeds a predetermined power threshold and provide a filtered output; and
   an inverse fast Fourier transform to convert the filtered output back to the time domain.

4. The apparatus of claim 3, wherein the predetermined threshold is programmable and less than about 10 decibels relative to a carrier frequency of the input signal.

5. The apparatus of claim 1, further comprising:
   a slicer to provide, for each burst, a slicer output that includes a hard decision output and an associated error output based on a de-rotated representation of the resultant signal; and
   a rotator configured to re-rotate the slicer output and provide a re-rotated signal based on the resultant signal, a computed phase estimate and a carrier offset, the ingress predictor being configured to compute the estimate of remaining predicted ingress noise residing in the adaptively equalized signal, for each burst, based on the re-rotated signal and the adaptively equalized signal.

6. The apparatus of claim 1 wherein the adaptive equalizer further comprises a feedforward equalizer having coefficients updated adaptively based on communication with at least one downstream device.

7. The apparatus of claim 6, wherein the feedforward equalizer comprises a linear T-spaced equalizer.

8. The demodulator of claim 1, wherein the burst mode digital input signal comprises a time division multiple access signal.

9. The apparatus of claim 1, further comprising an output stage to receive the resultant signal and generate a hard decision output based on the resultant signal, the output stage comprising:

a feedforward error detector to provide a feedforward error to the adaptive equalizer and a quantization signal based on the resultant signal and re-rotated signal;
a rotator to provide a de-rotated signal and the re-rotated signal based on a slicer output, the quantization signal, a phase estimate and carrier phase signal; and
a slicer to provide the slicer output, including hard decision and associate error signal, for valid burst mode conditions based on the de-rotated signal.

10. A method, comprising:
receiving a reverse path burst mode signal from at least one modem;
excising ingress noise from within a predetermined notch of the received burst mode signal to provide an excised signal;
gain scaling and adaptively linearly equalizing an estimation of the excised signal to provide an adaptively equalized signal;
predicting ingress noise remaining in the adaptively equalized signal for a valid burst condition based on a hard decision output that is substantially free of ingress; and
subtracting the predicted ingress noise from the adaptively equalized signal to provide an output that is substantially free of the predicted ingress noise.

11. The method of claim 10, further comprising filtering the excised signal to generate a response that is matched with respect to a source of the reverse path burst mode signal.

12. The method of claim 10, wherein the excising further comprises:
computing a feedforward error signal based on the output that is substantially free of the predicted ingress noise and a re-rotated signal, the adaptively linearly equalizing being based on the feedforward error signal;
rotating the hard decision output to provide a de-rotated signal and the re-rotated signal based on a quantization signal, a phase estimate and carrier phase signal; and
a slicer to provide the hard decision output, including hard decision and associate error signal, for valid burst mode conditions based on the de-rotated signal.

13. The method of claim 10, further comprising periodically updating coefficients of a linear feedforward equalizer based on a ranging response from at least one downstream modern, the adaptively linearly equalizing being performed by the linear feedforward equalizer according to the updated coefficients.

14. The method of claim 13, wherein the linear feedforward equalizer comprises a linear T-spaced equalizer.

15. The method of claim 10, wherein the excising ingress noise further comprises
converting the received burst mode signal from a time domain to a frequency domain representation thereof;
removing discrete frequencies in a selected spectrum, corresponding to a notch, from the frequency domain representation for each discrete frequency having a magnitude that exceeds a predetermined threshold and providing a filtered output; and
converting the filtered output back to a time domain representation thereof, the estimation of the excised signal being computed based on the time domain representation of the filtered output.

16. A system comprising:
reverse path electronics comprising:
a demodulator configured to receive a reverse-path burst-mode communication signal from at least one downstream modem, the demodulator comprising:
an ingress exciser configured to remove ingress noise from a digital representation of the reverse-path burst-mode communication signal for frequencies of the ingress noise having power above a predetermined threshold and residing within a narrowband of the reverse-path burst-mode communication signal, the ingress exciser further configured to generate an excised signal that is substantially free of ingress noise having power level above the predetermined threshold and within the narrowband;
an adaptive equalizer configured to adaptively equalize an estimate of the excised signal provided by the ingress exciser and to provide an adaptively equalized signal; and
an ingress predictor configured to predict an estimate of predicted ingress noise in the adaptively equalized signal, the estimate of predicted ingress noise being subtracted from the adaptively equalized signal to provide a resultant signal that is substantially free of the ingress noise, the demodulator providing an output signal based on the resultant signal;
forward path electronics configured to communicate forward-path signals to the at least one downstream modem to provide data addressed to the at least one downstream modem.

17. The system of claim 16, wherein the ingress exciser further comprises:
a fast Fourier transform to convert the reverse-path burst-mode communication signal from a time domain to a frequency domain representation thereof;
a threshold function to remove a selected portion of frequency content residing within the narrowband of the reverse-path burst-mode communication signal, corresponding to a notch, and having a power magnitude that exceeds the predetermined threshold and to provide a corresponding filtered output; and
an inverse fast Fourier transform to convert the corresponding filtered output back to a time domain representation thereof.

18. The system of claim 16, wherein the adaptive equalizer comprises a linear T-spaced equalizer.

19. The system of claim 18, wherein the reverse path electronics further comprise a control configured to periodically update coefficients the linear T-spaced equalizer based on a ranging response from the at least one downstream modem, such that the linear T-spaced equalizer performs the equalization to provide the adaptively equalized signal based on the updated coefficients.

20. The system of claim 16, further comprising an output stage to receive the resultant signal and generate a hard decision output based on the resultant signal, the output stage comprising:
a feedforward error detector to provide a feedforward error to the adaptive equalizer and a quantization signal based on the resultant signal and re-rotated signal;
a rotator to provide a de-rotated signal and the re-rotated signal based on a slicer output the quantization signal, a phase estimate and carrier phase signal; and
a slicer to provide the output signal for valid burst mode conditions based on the de-rotated signal.

* * * * *